June 30, 1936.   E. J. HOUDRY ET AL   2,045,600
APPARATUS FOR CONTACT MASSES
Filed Oct. 29, 1932

INVENTORS:
Eugene J. Houdry
BY Reeve H. Hammell
Ira L. Nickerson
ATTORNEY

Patented June 30, 1936

2,045,600

UNITED STATES PATENT OFFICE 2,045,600

APPARATUS FOR CONTACT MASSES

Eugene J. Houdry, Paris, France, and Reeve Howard Hammell, Oaklyn Manor, N. J., assignors to Houdry Process Corporation, Dover, Del., a corporation of Delaware Application October 29, 1932, Serial No. 640,198

4 Claims. (Cl. 23—288)

This invention relates to apparatus for effecting chemical transformations by the use of contact masses, and more particularly to apparatus in which apertured conduits for distribution and/or removal of fluids are embedded in the contact masses, after the manner indicated in certain copending applications of Eugene J. Houdry, namely, Serial No. 569,530, filed October 17, 1931, and Serial Nos. 611,362 and 611,363, filed May 14, 1932, also in the copending application of Thomas B. Prickett and Eugene J. Houdry, Serial No. 612,222, filed May 19, 1932.

One object of the invention is suitably to support the free end of a conduit in a definitely fixed position within a contact mass. Another object is to permit the limited amount of movement of the conduit resulting from expansion and contraction due to temperature variations. Another object is to prevent the contact mass from interfering with the expansive or contractive movement of the conduit, or from being damaged by such movement. Other objects will be apparent from the detailed description which follows.

The conduits may enter the casing containing the contact mass from any side and the supporting means for the free end of the conduit will normally be in or on the opposite wall. The supporting means are arranged to provide for limited longitudinal movement of the conduit while preventing lateral deviation. If the free end of the conduit is embedded within the mass, suitable provision is made for preventing particles of the contact mass from getting in or through the supporting means so as to interfere with the expansive movement of the conduit or to be damaged by such movement.

In order to illustrate the invention concrete embodiments thereof are shown in the accompanying drawing, in which.

Figure 6:
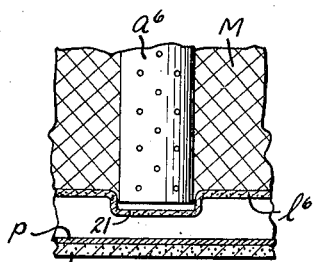
Figure 7:
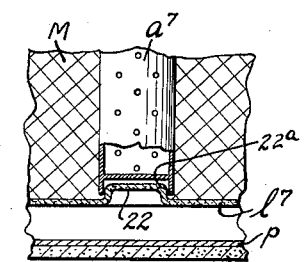
Figure 8:
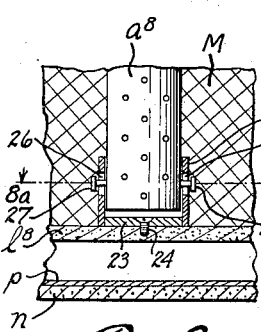
Figures 8A, 9:
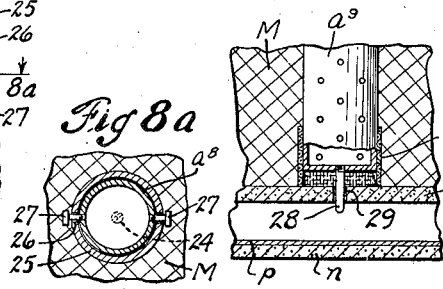

Figs. 4 to 9, inclusive, are fragmentary sectional views indicating modified ways of supporting an end of a conduit which is embedded within the contact mass; and Fig. 8a is a fragmentary, sectional view on the line 8a—8a of Fig. 8.

Figure 1:
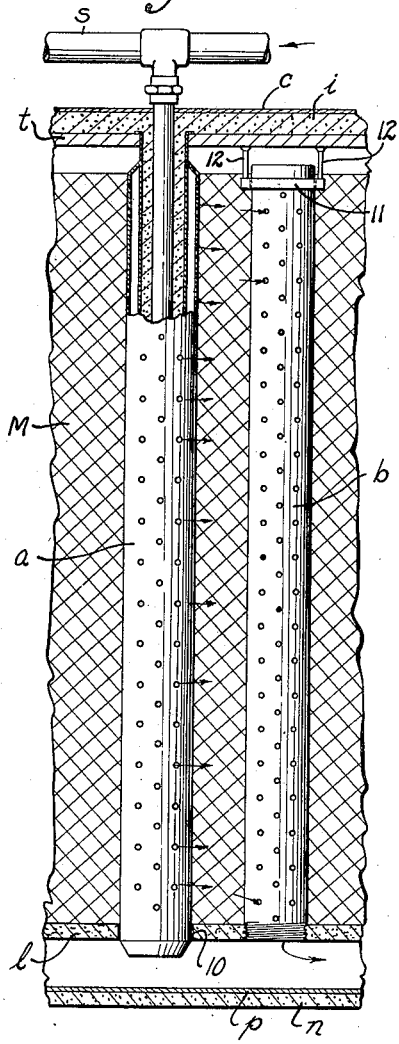
Fig. 1 is a fragmentary, sectional view, showing a portion of a casing providing a reaction chamber which contains a contact mass, and having inlet and outlet conduits for distributing fluids in and removing fluids from the contact mass.

Fig. 1 indicates a portion of a casing providing a chamber containing contact mass M of catalytic or other material suitable for effecting the desired conversion, transformation or modification on the starting material, and having a series of apertured distributing elements $a$ and a series of apertured outlet elements $b$ extending into the reaction chamber and embedded in or traversing contact mass M. To simplify the disclosure, only a portion of two walls of the reaction chamber is shown, namely the false bottom or supporting wall $l$ for the contact mass and the top wall $t$, and only one distributing element $a$ and one outlet element $b$, these elements being in juxtaposed parallelism, after the manner indicated more completely in the drawings of the copending Houdry application, Serial No. 611,362. Distributing element $a$, which is preferably of the nested conduit type disclosed in the aforementioned Prickett and Houdry application, Serial No. 612,222, extends through top wall $t$, to which it may be secured in any suitable manner, as by welding, the inner pipe of the element extending beyond and being suitably connected to a supply conduit or manifold $s$. The outlet element $b$ may extend through the opposite or lower wall $l$, with which it has screw-threaded connection, both elements having a multiplicity of perforations or ports throughout their length and, as indicated, the free ends of both elements terminate at or adjacent the wall opposite to that in which each is secured. Beyond wall $t$ and in spaced relation thereto, there is an outer cover $c$ confining a layer of insulating material $i$ on the outer surface of wall $t$, which insulating material may extend within element $a$ and encircle a portion of the inner pipe. In spaced relation to lower wall $l$, so as to provide an outlet chamber for the fluid products of the reaction, there is an outer cover or plate $p$ which, in this instance, has a layer of insulating material $n$ covering its outer face.

A reactant or other fluid passes from manifold $s$ through the inner conduit of element $a$ into the space between the inner and outer conduits and thence through the ports in the outer conduit of element $a$ into the surrounding contact mass M. The fluid finds its way through the surrounding parts of mass M to the ports in the nearest outlet element $b$ and thence into the outlet chamber beneath lower wall $l$.

Figure 2:
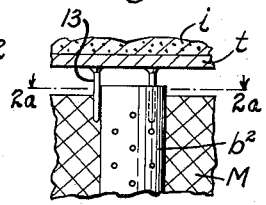
Figs. 2 and 3 are fragmentary views indicating modified ways of supporting a conduit end which extends above the contact mass.
Figure 3:
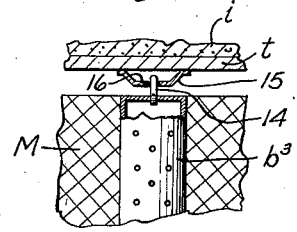

Inasmuch as a considerable number of distributing and outlet elements $a$ and $b$ will be used in a casing, and, furthermore, since the weight of the contact mass M will have a tendency to displace the elements, suitable guide and positioning means are provided for supporting the free ends of such elements. In using contact masses, the temperature of reaction frequently differs from the temperature of regeneration, and when there is a considerable spread between these temperatures, there will be expansive and contractive movement of the parts of the catalyst casing, including elements $a$ and $b$. Accordingly, in order to prevent injury to the apparatus and/or to the contact mass, especially when it comprises small particles, fragments or molded pieces of catalytic material of substantially uniform size, provision is made for a certain degree of relative movement of the parts of the apparatus, including the conduit elements, and for preventing interference with or injury to the catalyst by such movement. Figs. 1 to 3, inclusive, indicate three suitable ways of guiding and positioning the free end of an element when it extends above or outside the contact mass, while Figs. 1 and 4 to 9, inclusive, indicate ways for supporting the free end of the element when it is embedded in the contact mass.

Referring now to Fig. 1, distributing element $a$ is of a length to extend beyond limiting walls $l$ and $t$ of the catalytic chamber, the lower or free end of the element extending through a properly positioned aperture 10 and having a close sliding fit with the walls of the aperture, so that the particles of the contact mass M cannot enter. Outlet element $b$ is shorter than distributing element $a$ and terminates adjacent wall $t$. It is positioned in respect thereto by a depending loop or annulus 11 encircling the free end of element $b$ and supported from wall $t$ by two fixed posts 12.

Figure 2A:
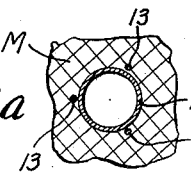
Fig. 2a is a fragmentary, sectional view on the line 2a—2a of Fig. 2.

In the modified locating arrangement for element $b^2$ shown in Figs. 2 and 2a, three posts 13 are provided, so positioned as slidably to receive the end of the element thereamong. In the form shown in Fig. 3, element $b^3$ has an extension or pin 14 for engagement with a bracket 15 which projects from wall $t$ and has an aperture 16 slidably receiving pin 14.

Figures 4, 5:
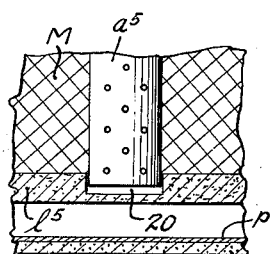

In Fig. 4, element $a^4$ is shorter than element $a$ of Fig. 1, and telescopingly engages with a close sliding fit a guide sleeve 17 which is fixedly mounted upon the upper face of wall $l$ in any suitable manner, as by welding. Sleeve 17 may have one or more apertures 18 to permit the passage of fluids, and there may be a drain port 19 (if desired) in wall $l^4$ for the removal of any liquid that may gather within sleeve 17. If the chamber has a thick wall, such as $l^5$ in Fig. 5, it may be bored or otherwise recessed to provide a socket 20 into which the free end of element $a^5$ may extend with a close sliding fit.

When the wall of the chamber is sufficiently thin, as indicated at $l^6$ in Fig. 6, it may be indented or depressed to form a socket 21, similar to socket 20 of Fig. 5, telescopingly to receive element $a^6$. If the indentation or depression is made from the opposite side, as indicated in Fig. 7, so as to form a boss or projection 22 upon wall $l^7$, the corresponding element $a^7$ may have an annular extension or projection 22a beyond its closed end for telescopingly engaging with a close sliding fit the exterior of guide boss 22.

In Figs. 8 and 8a, the guide projection or boss 8a is provided by a separate element or plate 23 of suitable shape secured to wall $l^8$ in any suitable manner, as by a stud or machine screw 24. In this case, the cooperating extension or projection on element $a^8$ is not integral or rigid with the element, as in Fig. 7, but is capable of relative movement. To this end, element $a^8$ carries at its free end a movable sleeve 25 which fits over guide plate 23 and has axial slots 26 through which extend stop and retaining pins 27 threaded into or otherwise secured to element $a^8$.

In the modification shown in Fig. 9, element $a^9$ has an extension in the form of a pin 28 similar to extension 14 on element $b^3$ in Fig. 3, but in this instance the locating pin 28 extends through an aperture 29 in wall $l^9$. To prevent particles of the contact mass from getting beneath element $a^9$ and being crushed when the latter expands, a ring 30 of suitable compressible material, preferably foraminous material such as metallic wire screening, is applied to the lower end of element $a^9$ and extends therebeyond to engage the adjacent wall $l^9$.

While the forms of the invention disclosed at the top of Fig. 1 and in Figs. 2 and 3 are available only when the free end of the fluid conduit extends beyond the contact mass, the forms shown at the bottom of Fig. 1 and in Figs. 4 to 9, inclusive, may be used whether the end of the fluid conduit is embedded in the contact mass or not. When it is undesirable to puncture the adjacent wall of the chamber, the guide means for conduit $a$ in Fig. 1 and for conduit $a^9$ in Fig. 9 would not be used, and if the form shown in Fig. 4 were used, the drain port 19 would be omitted. In reducing the invention to practice, it is to be understood that the reaction chamber may have only one set of conduits, either for distributing fluid throughout mass M or for withdrawing fluid from the interior of the mass, and that the conduits may be arranged to enter the chamber from any side, from different or opposite sides, or two sets of conduits from the same side.

We claim as our invention:

1. In apparatus for effecting endothermic and/or exothermic reactions, a casing providing a chamber containing a contact mass, an apertured conduit embedded in said mass for admitting or removing fluid and terminating adjacent but in spaced relation to a wall of said chamber, means for positioning and guiding said conduit and for keeping said mass out of the space between the conduit end and said wall comprising an apertured member encircling said conduit end and spanning said space, and means positively fixing the position of said member relative to said wall, a second apertured conduit having one end mounted in said wall and extending into said chamber in spaced parallel relation with said first conduit for removing or admitting fluid, and means slidably receiving and fixing the position of the other or free end of said second conduit.

2. Apparatus for effecting endothermic and/or exothermic chemical reactions comprising a casing having walls defining a chamber and a false bottom for supporting a contact mass within said chamber, vertically disposed apertured conduits extending into said mass from opposite directions for distributing reactants all through the mass and for removing reaction products from all parts of the mass, said false bottom having openings in which certain of said conduits are mounted and guide and positioning recesses for said other conduits, the top wall of said casing having openings in which said other conduits are mounted and depending means for guiding and positioning the conduits mounted in said false bottom.

3. In combination, a converter providing a reaction chamber for a contact mass, upper and lower horizontal walls defining said chamber, apertured conduits extending in parallelism from both of said walls into said chamber to be embedded in said mass for distributing reactants all through the mass and for removing reaction products from all parts of said mass, said conduits having their free ends terminating in or adjacent the opposite wall, and means on both said walls engaging said free ends of the conduits mounted on the opposite wall to position the same and to provide for movement under temperature changes while preventing the contact mass from interfering with such movement.

4. In combination, a converter providing a reaction chamber for a contact mass, upper and lower horizontal walls defining said chamber, apertured conduits mounted on each of said walls and extending toward the opposite wall to be disposed in spaced parallelism with one another and embedded in said mass for distributing reactants therein and for removing reaction products therefrom, means providing sockets on each of said walls, means on the free ends of said conduits for slidably engaging said sockets, and means for preventing the contact mass from interfering with movement of said conduits due to temperature changes.

EUGENE J. HOUDRY.
REEVE HOWARD HAMMELL.